United States Patent
Lee (10) Patent No.: US 10,179,408 B2
(45) Date of Patent: Jan. 15, 2019

(54) COOPERATION ROBOT FOR VEHICLE PRODUCTION SYSTEM AND METHOD FOR CONTROLLING THE SAME

(71) Applicant: KIA MOTORS CORPORATION, Seoul (KR)

(72) Inventor: Hyun Soo Lee, Seongnam-si (KR)

(73) Assignee: Kia Motors Corporation, Seoul (KR)

( * ) Notice: Subject to any disclaimer, the term of this patent is extended or adjusted under 35 U.S.C. 154(b) by 230 days.

(21) Appl. No.: 15/177,929

(22) Filed: Jun. 9, 2016

(65) Prior Publication Data

US 2017/0157778 A1 Jun. 8, 2017

(30) Foreign Application Priority Data

Dec. 2, 2015 (KR) .................. 10-2015-0170995

(51) Int. Cl.
B25J 13/08 (2006.01)
B25J 9/16 (2006.01)
(Continued)

(52) U.S. Cl.
CPC .......... *B25J 13/085* (2013.01); *B25J 9/1633* (2013.01); *B25J 9/1638* (2013.01); *B25J 9/1656* (2013.01);
(Continued)

(58) Field of Classification Search
CPC .. B25J 19/002; B25J 19/0008; B25J 19/0016; B25J 13/085; B25J 9/1633; B25J 9/1638; B25J 9/1656; B25J 15/08; G05B 19/423
See application file for complete search history.

(56) References Cited

U.S. PATENT DOCUMENTS

2008/0188985 A1* 8/2008 Sakano ................. B25J 9/1648
700/260
2009/0199385 A1* 8/2009 Maruo ................... B25J 9/0093
29/428
(Continued)

FOREIGN PATENT DOCUMENTS

JP H06-155365 A 6/1994
JP H07-241790 A 9/1995
(Continued)

OTHER PUBLICATIONS

Kang, I. H., Kim, H. S., Song, J. B., Lee, H. S., & Chang, I. S. (2014). Manipulator equipped with counterbalance mechanism based on gear unit. Transactions of the Korean Society of Mechanical Engineers, A, 38(3), 289-294. DOI: 10.3795/KSME-A.2014.38.3.289 (Year: 2014).*

*Primary Examiner* — Adam R Mott
(74) *Attorney, Agent, or Firm* — McDermott Will & Emery LLP (57) ABSTRACT

A cooperation robot for moving a bumper to a predetermined position of a vehicle in a vehicle production system includes: a multi-axis arm, a front end portion of which is connected to and a rear end portion of which is connected to a robot body so that the multi-axis arm is movably disposed to upper, lower, left and right sides on the basis of the robot body. The multi-axis arm is disposed to rotate the gripper. A force torque (FT) sensor is disposed between the multi-axis arm and the gripper and detects a direction of external force which is applied to the gripper and the bumper gripped by the gripper. An operator controls the multi-axis arm so that positions of the gripper and the bumper vary. A controller controls the operator according to the direction of the
(Continued)

external force detected by the FT sensor when the multi-axis arm is in a stand-by condition to move the gripper in the direction the external force.

11 Claims, 6 Drawing Sheets

(51) Int. Cl.
    *B25J 15/08*     (2006.01)
    *B25J 19/00*     (2006.01)
    *G05B 19/423*     (2006.01)

(52) U.S. Cl.
    CPC ........... *B25J 15/08* (2013.01); *B25J 19/0016* (2013.01); *G05B 19/423* (2013.01); *B25J 9/1676* (2013.01); *G05B 2219/36429* (2013.01); *G05B 2219/45067* (2013.01)

(56) References Cited

U.S. PATENT DOCUMENTS

| | | | |
|---|---|---|---|
| 2011/0078508 A1* | 3/2011 | Komatsu | B25J 9/1075 714/37 |
| 2014/0119871 A1* | 5/2014 | Park | B25J 9/046 414/728 |
| 2015/0177084 A1* | 6/2015 | Inoue | B25J 9/1676 73/862.541 |
| 2016/0214261 A1* | 7/2016 | Davis | B25J 13/085 |
| 2016/0236359 A1* | 8/2016 | Song | B25J 9/1065 |

FOREIGN PATENT DOCUMENTS

| | | |
|---|---|---|
| JP | 2002-283276 A | 10/2002 |
| JP | 2010-269419 A | 12/2010 |
| JP | 2011-056646 A | 3/2011 |
| KR | 10-2013-0015818 A | 2/2013 |

\* cited by examiner

COOPERATION ROBOT FOR VEHICLE PRODUCTION SYSTEM AND METHOD FOR CONTROLLING THE SAME

CROSS-REFERENCE TO RELATED APPLICATION

This application claims the benefit of priority to Korean Patent Application No. 10-2015-0170995 filed in the Korean Intellectual Property Office on Dec. 2, 2015, the entire content of which is incorporated herein by reference.

TECHNICAL FIELD

The present disclosure relates to a cooperation robot for a vehicle production system. More particularly, the present disclosure relates to a cooperation robot for a vehicle production system and a method for controlling the cooperation robot for the vehicle production system, capable of gripping a bumper, moving a vehicle body to a predetermined position, and easily mounting the bumper on the vehicle body.

BACKGROUND

In the industry manufacturing field, a cooperation robot has been used for simple repetitive and hard operation which brings musculoskeletal injury to workers.

During the vehicle assembly, a process of mounting a trunk lead hinge on a vehicle body needs repetitive operation, and thus, places stresses to a wrist of the worker. To lessen this problem, energy saving equipment of weight balance type has been used.

However, load of the worker increases during engaging the trunk lead hinge because it is difficult to control exact position of this energy saving equipment, and it is difficult to apply the energy saving equipment to various types of vehicles.

Accordingly, researches related to intelligent energy saving loader having worker's delicacy and robot's obdurability have been undertaken. By these researches, labor load and field danger are lessen, effect of commonly applying to various vehicles is expected.

The above information disclosed in this Background section is only for enhancement of understanding of the background of the invention, and therefore, it may contain information that does not form the prior art that is already known in this country to a person of ordinary skill in the art.

SUMMARY

An aspect of the present disclosure provides a cooperation robot for a vehicle production system, capable of improving efficiency of manufacturing system by providing the cooperation robot assisting a worker and by combining intelligence and delicacy of human and improving durability and control performance of the robot.

A cooperation robot for moving a bumper to a predetermined position of a vehicle in vehicle production system according to an exemplary embodiment in the present disclosure may include a multi-axis arm, a front end portion of which is connected to a gripper for gripping the bumper and a rear end portion of which is connected to a robot body, so that the multi-axis arm is disposed movably to upper, lower, left and right sides of the robot body. The robot body rotates the gripper A force torque (FT) sensor is disposed between the multi-axis arm and the gripper and detects a direction of external force that is applied to the gripper and the bumper gripped by the gripper. An operator controls the multi-axis arm so that a position of the gripper and the bumper varies. A controller controls the operator according to the direction of the external force detected by the FT sensor when the multi-axis arm is in a stand-by condition to move the gripper in the direction of the external force.

The cooperation robot may further includes a gravity compensation apparatus mounted on an opposite side of the multi-axis arm on the basis of the robot body, and decreasing rotational torque applied to the robot body by the multi-axis arm by moving weight becoming close to or far from the robot body.

The operator may include a motor providing torque moving the gripper to a predetermined route in three-dimensional space by moving the multi-axis arm along a predetermined axis or rotating the multi-axis arm around the axis.

The controller detects a reference rotation position and an actual rotation position of the motor and decides whether collision is occurred according to the reference rotation position and the actual rotation position, and if it is decided that collision is occurred, operation of the motor may be stopped.

The cooperation robot further may include a neighboring sensor disposed on a side of the multi-axis arm and detecting an object in a predetermined distance region, and the controller stops operation of multi-axis arm if the object is detected by the neighboring sensor.

The gravity compensation apparatus may include an arm rotation portion rotating together according to moving to upper and lower sides of the multi-axis arm, a pushing arm a side is disposed to rotate according to the arm rotation portion and other side is disposed to push the weight away from the robot body, and an elastic member elastically supporting the weight toward the robot body.

The cooperation robot may include a fixing bracket fixed on the robot body by a predetermined interval with the weight, and a guide rod extending to opposite side of the robot body from the weight and disposed to penetrate the fixing bracket, and the elastic member may be interposed between the fixing bracket and the weight in a compressed state.

The elastic member may be a coil-spring type rolled up along a circumference of the guide rod, a side portion of the elastic member may be supported by the fixing bracket, and another side of the elastic member is disposed to push the weight.

A method for controlling a cooperation robot of a vehicle production system according to an exemplary embodiment in the present disclosure includes gripping a bumper using a gripper disposed on a front end portion of a multi-axis arm, moving the bumper to a predetermined position of the vehicle by operating the multi-axis arm, detecting direction of external force applied to the bumper of the gripper by a force torque (FT) sensor while the multi-axis arm is stopped, and adjusting a position of the bumper disposed on the gripper by operating the multi-axis arm according to the direction of the external force.

The position of the gripper may be controlled in three-dimensional space by operating the multi-axis arm by using a motor and a decelerating gear, a reference rotation position and an actual rotation position of the motor are detected, and it is decided whether collision is occurred according to difference between the reference rotation position and the actual rotation position, and if it is decided that the collision is occurred, the operation of the motor may be stopped.

When it is decided that an object is detected at a neighboring sensor disposed on a side of the multi-axis arm and detecting an object in a predetermined distance, operation of the multi-axis arm may be stopped.

The gripper is mounted on a front end portion of the multi-axis arm, and a robot body is disposed on a rear end portion, and the method may include decreasing rotational torque applied to the robot body by the multi-axis arm by moving weight becoming close to or far from the robot body, the weight is disposed on opposite side of the multi-axis arm on the basis of the robot body according to upper and lower position of the multi-axis arm.

The FT sensor may be disposed on a part connecting the multi-axis arm and the gripper.

According to the present invention for accomplishing the purpose these, operator's delicacy and robot's obdurability may be provided at the same time by moving a bumper to a predetermined position by using a cooperation robot, detecting direction of force applied to the cooperation robot by an FT sensor, and precisely adjusting a position of a multi-axis arm to the detected direction of the force.

Further, stability may be improved by detecting operators or objects by neighboring sensor to stop movement of the multi-axis arm.

Further, operational stability and precision of the entire cooperation robot may be improved by preventing shaking of the multi-axis arm by using a gravity compensation apparatus.

Further, in case of detecting collision by using rotational position of a motor operating the multi-axis arm, more stable production system may be provided by stopping operation of the multi-axis arm.

DETAILED DESCRIPTION OF THE EMBODIMENTS

An exemplary embodiment in the present disclosure will hereinafter be described in detail with reference to the accompanying drawings.

Figure 1:
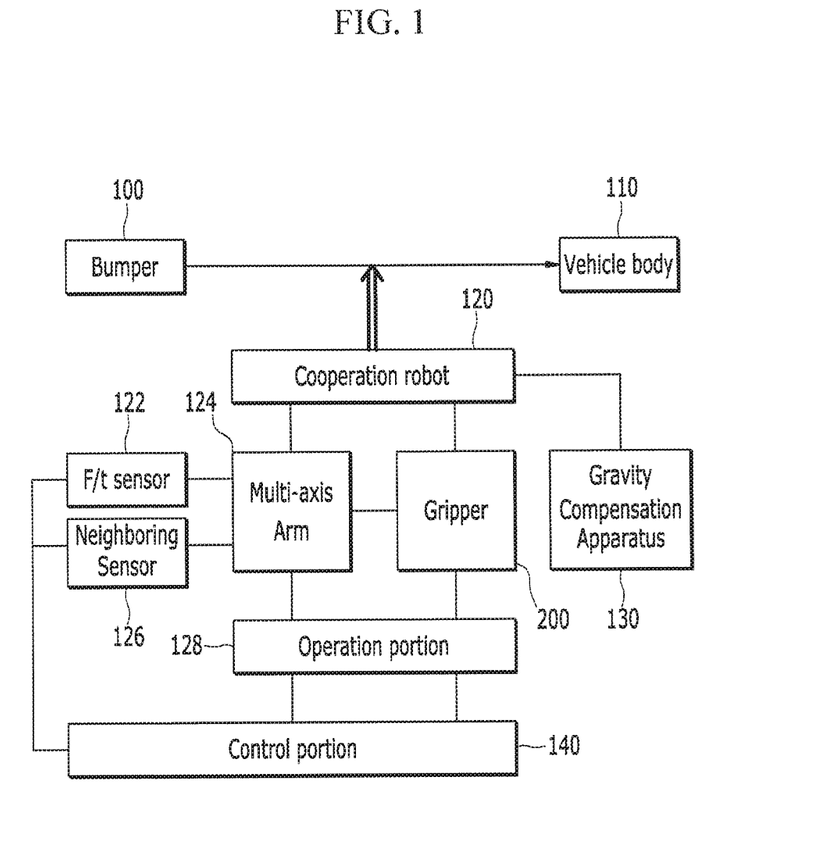
FIG. 1 is a schematic diagram of a cooperation robot for a vehicle production system according to an exemplary embodiment in the present disclosure.

FIG. 1 is a schematic diagram of a cooperation robot for a vehicle production system according to an exemplary embodiment in the present disclosure.

Referring to FIG. 1, a cooperation robot for a vehicle production system includes a bumper 100, a vehicle body 110, and a cooperation robot 120, and the cooperation robot 120 includes a multi-axis arm 124, a gripper 200, a gravity compensation apparatus 130, a force torque (FT) sensor 122, a neighboring sensor 126, an operator 128, and a controller 140.

The gripper 200 is mounted on an end portion of the multi-axis arm 124, the operator 128 varies a position and a rotational position of the gripper 200 by the multi-axis arm 124 in three-dimensional space and grips the bumper 100 by operating the gripper 200.

The FT sensor 122 detects a direction of external force and strength of the gripper 200 or the bumper 100 gripped by the gripper 200, and the controller 140 may control the multi-axis arm 124 according to the external force and strength detected by the FT sensor 122 to control a precise position of the bumper 100.

The neighboring sensor 126 detects objects or workers surrounding the multi-axis arm 124 or the gripper 200 and transmits the detected signal to the controller 140, and the controller 140 stops operation of multi-axis arm 124 and the gripper 200 using detection signal transmitted at the neighboring sensor 126.

Figure 4:
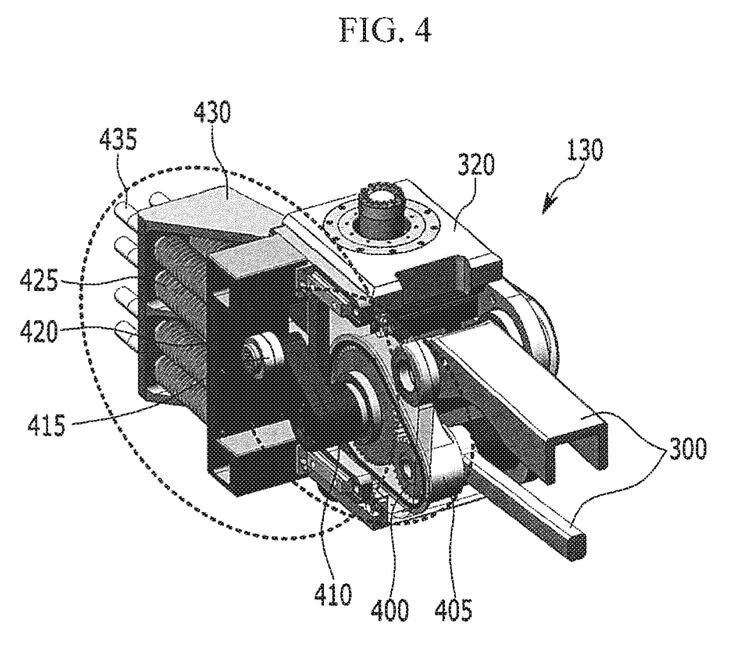
FIG. 4 is a partial perspective view of a cooperation robot and a gravity compensation apparatus according to an exemplary embodiment in the present disclosure.
Figure 5:
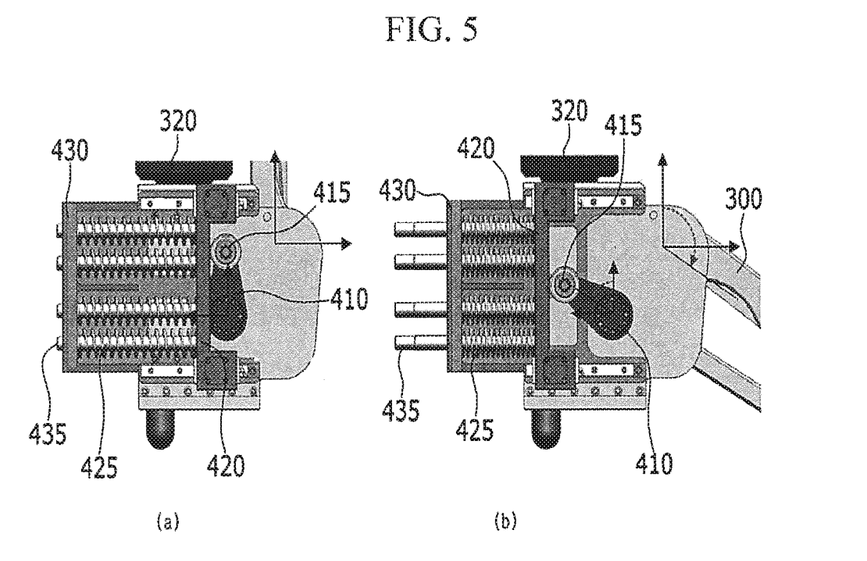
FIG. 5 is a partial side view illustrating operation state of a gravity compensation apparatus mounted on a cooperation robot according to an exemplary embodiment in the present disclosure.

According to an exemplary embodiment of the present invention, the gravity compensation apparatus 130 is described afterwards by referring FIG. 4 and FIG. 5, and the controller 140 may be realized by at least one microprocessor operating by a predetermined program, and the predetermined program may include a series of orders for conducting method according to the present disclosure.

Figure 2:
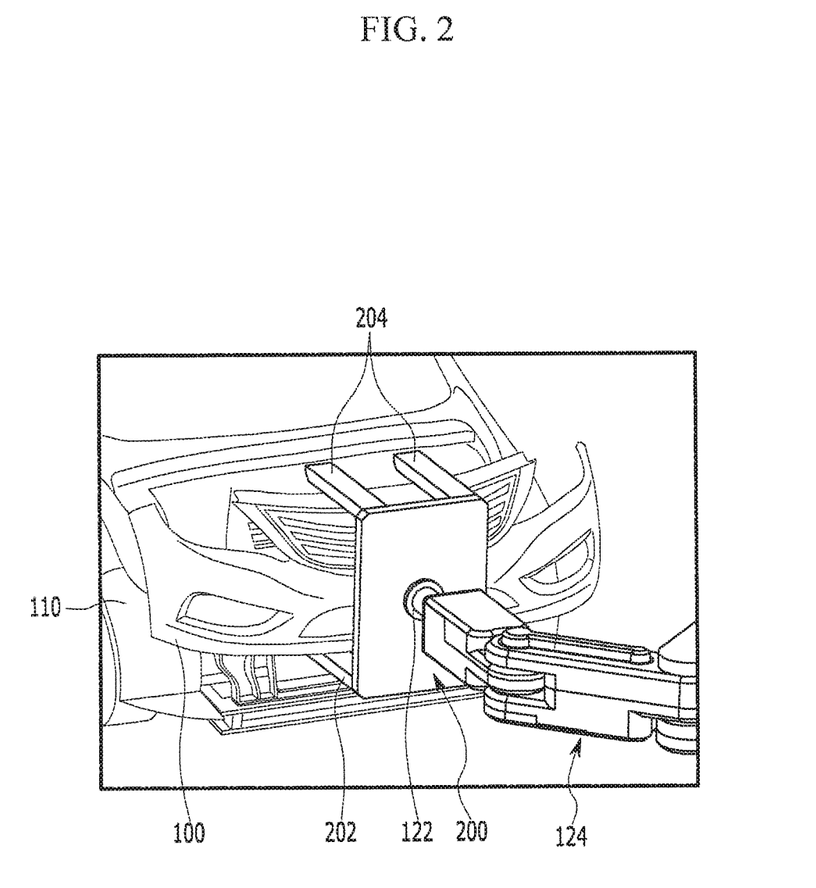
FIG. 2 is a partial perspective view of a cooperation robot for a vehicle production system according to an exemplary embodiment in the present disclosure.

FIG. 2 is a partial perspective view of a cooperation robot for a vehicle production system according to an exemplary embodiment in the present disclosure.

Referring to FIG. 2, the gripper 200 is mounted on an end portion of the multi-axis arm 124, and the gripper 200 controls a position of an upper finger 204 and a lower finger 202 to grip center upper and lower parts of the bumper 100 and to move to the front of the vehicle body 110.

The operator 128 includes a motor and decelerator and controls operation of the multi-axis arm 124 and the gripper 200 by using rotational force of the motor, and the controller 140 detects an actual rotation position of the motor and detects external collision by using a difference value between the actual rotation position and a theoretical rotation position to stop the operation of the motor and to stop the operation of the multi-axis arm 124 and the gripper 200.

That is, when impact is applied to the multi-axis arm 124, the gripper 200 or the bumper 100 by a worker or an external object, a rotation position of the motor operating the multi-axis arm 124 or the gripper 200 varies. If it is decided that the varied value is more than a predetermined value, the operator is stopped and additional collision or problem may be prevented in advance.

According to an exemplary embodiment in the present disclosure, the structure and principle of operating the multi-axis arm 124 and the gripper 200 by the motor and the decelerator are referred to well-known technology, and therefore, a detailed description thereof will be omitted.

Figure 3:
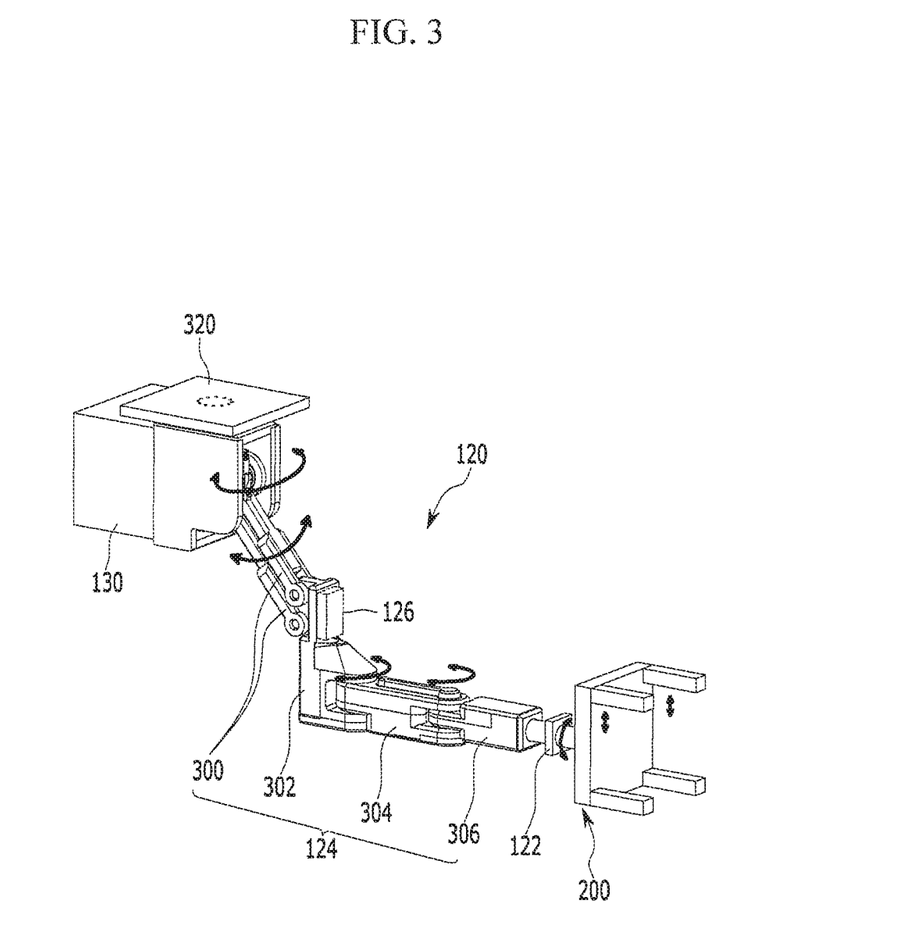
FIG. 3 is an entire perspective view of a cooperation robot according to an exemplary embodiment in the present disclosure.

FIG. 3 is an entire perspective view of a cooperation robot according to an exemplary embodiment in the present disclosure.

Referring to FIG. 3, the cooperation robot 120 includes the gravity compensation apparatus 130, the robot body 320, a first axis 300, the neighboring sensor 126, an arm body 302, a second axis 304, a third axis 306, the FT sensor 122 and the gripper 200.

The first axis 300 is connected to the robot body 320 by a drive shaft, the arm body 302 is disposed at an end part of the first axis 300, the second axis 304 is connected to an end part of the arm body 302, the third axis 306 is connected to an end part of the second axis 304, the gripper 200 is connected to an end part of the third axis 306, and the FT sensor 122 is disposed between the gripper 200 and the third axis 306.

The robot body 320 rotates the first axis 300 to left and right sides, raises to upper side or lowers to a lower side, and the arm body 302 moves to the upper or lower sides by the first axis 300.

In addition, the second axis 304 moves to the left and right sides by the motor and the decelerator on the basis of the arm body 302, and the third axis 306 moves to the left and right sides by the motor and the decelerator on the basis of the second axis 304.

According to the present disclosure, the gripper 200 may include the upper finger 204 and the lower finger 202 which grip the upper part and the lower part of the bumper 100 mounted on the vehicle body 110 and may include a cylinder moving the upper finger 204 and the lower finger 202 to the upper, lower, left and right sides. Here, the gripper 200 may have a structure rotating by the motor and the decelerator installed at the third axis 306.

In addition, the neighboring sensor 126 is disposed on a front surface of the arm body 302 and detects surrounding objects or workers to transmit signal to the controller 140. Further, the controller 140 may stop movement of the multi-axis arm 124 to prevent collision of the multi-axis arm 124 of the cooperation robot 120 with the objects or workers in advance by the signal transmitted from the neighboring sensor 126. In addition, the neighboring sensor 126 is mounted on the front surface of the arm body 302, or may be mounted on a predetermined position of the multi-axis arm.

FIG. 4 is a partial perspective view of a cooperation robot and a gravity compensation apparatus according to an exemplary embodiment in the present disclosure.

Referring to FIG. 4, the gravity compensation apparatus 130 is disposed on an opposite side of the multi-axis arm 124 on the basis of the robot body 320. The gravity compensation apparatus 130 includes an arm rotation portion 400, a torque transfer portion 405, a pushing arm 410, a roller 415, a weight 420, an elastic member 425, a fixing bracket 430 and a guide rod 435.

When the first axis 300 rotates on the basis of the drive shaft (308 in FIG. 3), the arm rotation portion 400 rotates, and the arm rotation portion 400 rotates the pushing arm 410 through the torque transfer portion 405 of a belt or a chain type.

Further, when the pushing arm 410 rotates, the roller 415 disposed on a front end of the pushing arm 410 compresses the elastic member 425 to push the weight 420. Here, the fixing bracket 430 is fixed on the robot body 320, and the guide rod 435 guides movement of the weight 420.

FIG. 5 is a partial side view illustrating operation state of a gravity compensation apparatus mounted on a cooperation robot according to an exemplary embodiment in the present disclosure.

Referring to FIG. 5, the guide rod 435 facing rearward of the weight 420 is provided, and a front end portion of the guide rod 435 is disposed penetrating the fixing bracket 430.

The elastic member 425 is a coil spring type and rolled along an exterior circumference, and one end part of the elastic member 425 supports elastically the weight 420 to a side of the multi-axis arm 124 and another end part is supported elastically at the fixing bracket 430.

In addition, the roller 415 pushes the weight 420 to the opposite side of the multi-axis arm 124 according to a rotation position of the pushing arm 410, and the elastic member 425 pushes the weight 420 to the side of the multi-axis arm 124 in the state which the roller 415 does not push the weight 420.

In the present disclosure, entire stability of operation of the cooperation robot and durability etc. may be improved and reduce shaking of the multi-axis arm 124 on the basis of the robot body 320 by pushing or puffing the weight 420 by the pushing arm 410 through the roller 415. A rotational torque applied to the robot body 320 is reduced by movement to the upper and lower direction of the multi-axis arm 124.

Figure 6:
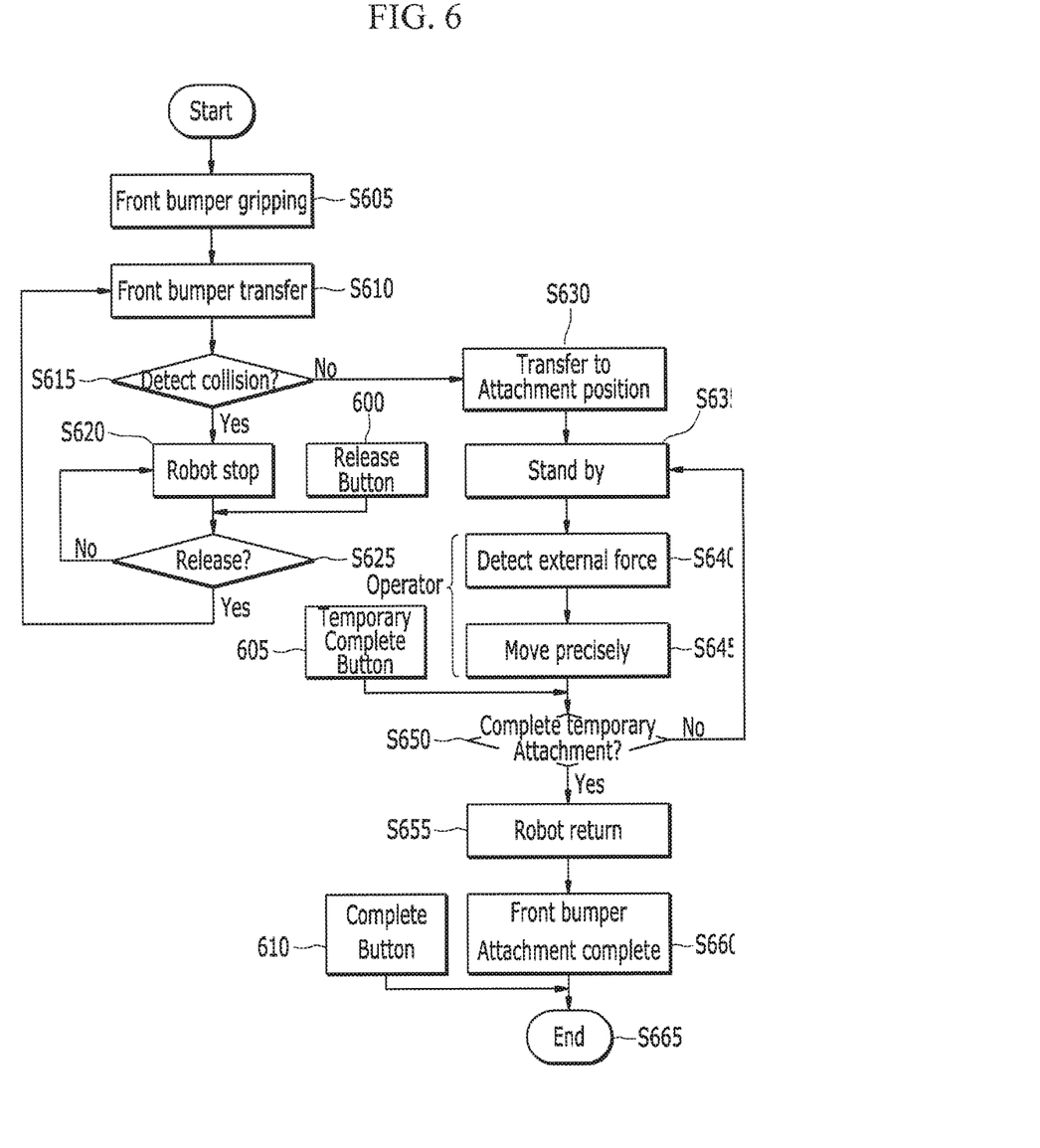
FIG. 6 is a flowchart illustrating a method for controlling a cooperation robot of a vehicle production system according to an exemplary embodiment in the present disclosure.

FIG. 6 is a flowchart illustrating a method for controlling a cooperation robot of a vehicle production system according to an exemplary embodiment in the present disclosure.

Referring to FIG. 6, a control starts in S600, the bumper 100 is gripping by the gripper 200 in S605, and the bumper is transferred to a predetermined route in S610.

A logic detecting collision through a rotation position error of the motor in a process of transferring the bumper 100 by the gripper 200 and the multi-axis arm 124 is performed in S615.

Here, an actual rotation position and a theoretical rotation position of the motor are compared, and the controller 140 may detect collision according to the amount of difference value between them.

When the collision is detected in S615, an operation of the cooperation robot 120 stops and transfer of the bumper 100 is stopped. Further, when release button 600 is pushed by the worker, stop of the cooperation robot 120 is released in S625, and S610 is performed again.

If the collision is not detected in S615, the bumper 100 is transferred to the predetermined position in S630, and the cooperation robot 120 stands by in stopped state at the predetermined position of the bumper 100 in S635.

The worker may provide external force to the gripper 200 or the bumper 100 to adjust position of the bumper 100 in S640 and S645. Here, the controller 140 may precisely adjust the position of the bumper by operating the multi-axis arm 124.

More specifically, the FT sensor 122 detects a direction and a force applied from the gripper 200 or the bumper 100 in S640 and transmit a signal to the controller 140, and the controller 140 controls the multi-axis arm 124 according to the direction and the force detected by the FT sensor 122 to precisely adjust position of the bumper 100.

Next, when the worker pushes temporary complete button 605, it is decided that temporary attachment of the bumper 100 is completed in S650, and the gripper 200 releases gripping of the bumper 100 and the robot returns to the initial position in S655.

Further, if it is decided that attachment of the bumper 100 is completed by the complete button 610 in S660, attachment mode of the bumper 100 ends in S665, and S600 starts again.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A cooperation robot for moving a bumper to a predetermined position of a vehicle in a vehicle production system, the cooperation robot comprising:

a multi-axis arm, a front end portion of which is connected to a gripper for gripping the bumper and a rear end portion of which is connected to a robot body, so that the multi-axis arm is movably disposed around upper, lower, left and right sides of the robot body and rotates the gripper;

a force torque (FT) sensor disposed between the multi-axis arm and the gripper, the FT sensor detecting a direction of external force applied to the gripper and the bumper that is gripped by the gripper;

an operator controlling the multi-axis arm so that a position of the gripper and the bumper, which is gripped by the gripper, varies;

a controller controlling the operator according to the direction of the external force detected by the FT sensor when the multi-axis arm is in a stand-by condition to move the gripper to in the direction of the external force; and a neighboring sensor disposed on a side of the multi-axis arm and detecting an object in a predetermined distance region;

wherein the controller stops operation of the multi-axis arm if the object is detected by the neighboring sensor, wherein the multi-axis arm includes:
a first axis having one end that is connected to the robot body by a drive shaft;
an arm body having one end that is connected to another end of the first axis;
a second axis having one end connected to another end of the arm body; and
a third axis having one end, which is connected to another end of the second axis, and another end, which is connected to the gripper, wherein the FT sensor is disposed between the gripper and the third axis, and wherein the neighboring sensor is disposed on a front surface of the arm body.

2. The cooperation robot of claim 1, further comprising:
a gravity compensation apparatus mounted on an opposite side of the multi-axis arm based on the robot body and decreasing a rotational torque applied to the robot body by the multi-axis arm by moving a weight toward or away from the robot body.

3. The cooperation robot of claim 1, wherein the operator includes:
a motor generating a torque to move the gripper to a predetermined route in a three-dimensional space by moving the multi-axis arm along a predetermined axis or rotating the multi-axis arm around the predetermined axis.

4. The cooperation robot of claim 3, wherein the controller detects a reference rotation position and an actual rotation position of the motor and determines whether collision occurs according to a difference value between the reference rotation position and the actual rotation position, and
wherein when the controller determines that that collision occurs, the motor stops operating.

5. The cooperation robot of claim 2, wherein the gravity compensation apparatus includes:
an arm rotation portion rotating as the upper and lower sides of the multi-axis arm move;
a pushing arm, one side of which rotates according to the arm rotation portion and another side of which is disposed to push the weight away from the robot body; and
an elastic member elastically supporting the weight toward the robot body.

6. The cooperation robot of claim 5, further comprising:
a fixing bracket fixed on the robot body by a predetermined interval with the weight; and
a guide rod extending on the weight away from the robot body and penetrating the fixing bracket,
wherein the elastic member is interposed between the fixing bracket and the weight in a compressed state.

7. The cooperation robot of claim 6, wherein the elastic member is a coil-spring that is rolled up along a circumference of the guide rod,
wherein one side portion of the elastic member is supported by the fixing bracket and another side of the elastic member is disposed to push the weight.

8. A method for controlling a cooperation robot of a vehicle production system, comprising steps of:
gripping a bumper using a gripper which is disposed on a front end portion of a multi-axis arm;
moving the bumper to a predetermined position of the vehicle by operating the multi-axis arm;
detecting a direction of external force applied to the bumper gripped by the gripper by a force torque (FT) sensor while the multi-axis arm is stopped; and
adjusting a position of the bumper that is disposed on the gripper by operating the multi-axis arm according to the direction of the external force,
wherein when an object is detected at a neighboring sensor, which is disposed on a side of the multi-axis arm, in a predetermined distance, the multi-axis arm stops operating,
wherein the multi-axis arm includes:
a first axis having one end that is connected to the robot body by a drive shaft;
an arm body having one end that is connected to another end of the first axis;
a second axis having one end connected to another end of the arm body; and
a third axis having one end, which is connected to another end of the second axis, and another end, which is connected to the gripper,
wherein the FT sensor is disposed between the gripper and the third axis, and
wherein the neighboring sensor is disposed on a front surface of the arm body.

9. The method of claim 8, wherein, in the step of moving the bumper, a position of the gripper is controlled in a three-dimensional space by operating the multi-axis arm by using a motor and a decelerating gear,
wherein in the step of detecting the direction of the external force, a reference rotation position and an actual rotation position of the motor are detected and according to a difference between the reference rotation position and the actual rotation position it is determined whether a collision occurs, and
when it is determined that the collision is occurred, the motor stops operating.

10. The method of claim 8, further comprising:
decreasing a rotational torque that is applied a robot body of the cooperation robot by the multi-axis arm by moving a weight toward or away from the robot body, the weight is disposed on opposite side of the multi-axis arm on the basis of the robot body according to upper and lower position of the multi-axis arm,
wherein the gripper is mounted on a front end portion of the multi-axis arm and the robot body is disposed on a rear end portion of the multi-axis arm.

11. The method of claim 8, wherein the FT sensor is disposed on a part connecting the multi-axis arm and the gripper.

\* \* \* \* \*